United States Patent
Berstis et al.

(10) Patent No.: US 8,005,811 B2
(45) Date of Patent: *Aug. 23, 2011

(54) SYSTEMS AND MEDIA FOR UTILIZING ELECTRONIC DOCUMENT USAGE INFORMATION WITH SEARCH ENGINES

(75) Inventors: Viktors Berstis, Austin, TX (US); Randolph Michael Forlenza, Austin, TX (US)

(73) Assignee: Google Inc., Mountain View, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 12/166,082

(22) Filed: Jul. 1, 2008

(65) Prior Publication Data

US 2008/0275871 A1 Nov. 6, 2008

Related U.S. Application Data

(63) Continuation of application No. 11/032,872, filed on Jan. 11, 2005, now Pat. No. 7,421,426.

(51) Int. Cl.
*G06F 17/30* (2006.01)
*G06F 7/00* (2006.01)
(52) U.S. Cl. ........................................ 707/706; 707/725
(58) Field of Classification Search .................. 707/706, 707/723
See application file for complete search history.

(56) References Cited

U.S. PATENT DOCUMENTS

| | | | |
|---|---|---|---|
| 5,630,125 A | 5/1997 | Zellweger | |
| 5,819,451 A | 10/1998 | Khon | |
| 5,899,995 A | 5/1999 | Millier et al. | |
| 6,182,067 B1 | 1/2001 | Presnell et al. | |
| 6,353,824 B1 | 3/2002 | Boguraev et al. | |
| 6,370,551 B1 | 4/2002 | Golovchinsky et al. | |
| 6,377,983 B1 | 4/2002 | Cohen et al. | |
| 6,393,427 B1 | 5/2002 | Vu et al. | |
| 6,553,373 B2 | 4/2003 | Boguraev et al. | |
| 6,678,699 B2 | 1/2004 | Stephens et al. | |
| 6,732,090 B2 | 5/2004 | Shanahan et al. | |
| 6,778,979 B2 | 8/2004 | Grefenstette et al. | |
| 6,820,075 B2 | 11/2004 | Shanahan et al. | |
| 6,865,572 B2 | 3/2005 | Boguraev et al. | |
| 6,928,425 B2 | 8/2005 | Grefenstette et al. | |
| 6,948,163 B2 | 9/2005 | Melahn et al. | |
| 6,959,319 B1 | 10/2005 | Huang et al. | |
| 7,069,271 B1 | 6/2006 | Fadel et al. | |

(Continued)

OTHER PUBLICATIONS

Ian Hutchinson, "Graphics for Inclusion in Electronic Documents," Feb. 6, 2005, http://silas psfc.mit.edu/elec/Figlelctr_fig/elec_figures, pp. 1-14.

(Continued)

*Primary Examiner* — Jacob F Bétit
(74) *Attorney, Agent, or Firm* — Fish & Richardson P.C.

(57) ABSTRACT

Systems and media for utilizing electronic document usage information are disclosed. More particularly, hardware and/or software utilizing electronic document usage information to respond to user search requests with search engines are disclosed. Embodiments include receiving a search request from a requesting user and receiving document utilization information associated with one or more electronic documents, where the document utilization information provides an indication of the usage of the electronic documents by one or more users. Further embodiments include generating search results based at least partially on the search request and the document utilization information and transmitting an indication of the search results to the requesting user. Further embodiments include generating statistical information regarding the search results for electronic documents and transmitting the generated statistical information.

8 Claims, 6 Drawing Sheets

U.S. PATENT DOCUMENTS

| | | | |
|---|---|---|---|
| 7,117,432 B1 | 10/2006 | Shanahan et al. | |
| 7,133,862 B2 | 11/2006 | Hubert et al. | |
| 7,181,438 B1 | 2/2007 | Szabo | |
| 7,249,314 B2 | 7/2007 | Walker et al. | |
| 7,284,191 B2 | 10/2007 | Grefenstette et al. | |
| 7,313,827 B2 | 12/2007 | Kelley et al. | |
| 7,367,048 B2 | 4/2008 | Kelley et al. | |
| 7,383,305 B2 | 6/2008 | Kelley et al. | |
| 7,386,569 B2 | 6/2008 | Berstis et al. | |
| 7,386,783 B2 | 6/2008 | Lection et al. | |
| 7,421,426 B2 | 9/2008 | Berstis et al. | |
| 7,433,866 B2 | 10/2008 | Berstis et al. | |
| 7,437,381 B2 | 10/2008 | Berstis et al. | |
| 7,469,331 B2 | 12/2008 | Hepkin et al. | |
| 7,475,021 B2 | 1/2009 | Wilbrink et al. | |
| 7,519,607 B2 | 4/2009 | Anderson, IV | |
| 7,590,589 B2 | 9/2009 | Hoffberg | |
| 7,627,590 B2 | 12/2009 | Boguraev et al. | |
| 7,730,054 B1 * | 6/2010 | Marmaros et al. | 707/713 |
| 2001/0056463 A1 | 12/2001 | Grady et al. | |
| 2002/0035697 A1 | 3/2002 | McCurdy et al. | |
| 2002/0048369 A1 | 4/2002 | Ginter et al. | |
| 2002/0065848 A1 | 5/2002 | Walker et al. | |
| 2002/0078045 A1 * | 6/2002 | Dutta | 707/7 |
| 2002/0095443 A1 | 7/2002 | Kovack | |
| 2002/0184159 A1 | 12/2002 | Tadayon et al. | |
| 2003/0074369 A1 | 4/2003 | Schuetze et al. | |
| 2003/0126235 A1 | 7/2003 | Chandrasekar et al. | |
| 2003/0145306 A1 | 7/2003 | Melahn et al. | |
| 2004/0049571 A1 | 3/2004 | Johnson et al. | |
| 2004/0088415 A1 | 5/2004 | Chandrasekar et al. | |
| 2006/0155782 A1 | 7/2006 | Berstis et al. | |
| 2006/0173818 A1 | 8/2006 | Berstis et al. | |
| 2008/0222000 A1 | 9/2008 | Berstis et al. | |
| 2008/0275871 A1 | 11/2008 | Berstis et al. | |

OTHER PUBLICATIONS

Non-final office action dated Apr. 19, 2007 for U.S. Appl. No. 11/032,872.
Notice of Allowance dated May 20, 2008 for U.S. Appl. No. 11/032,872.
Notice of Allowance dated Sep. 12, 2007 for U.S. Appl. No. 11/032,871.
Non-final office action dated Apr. 25, 2007 for U.S. Appl. No. 11/032,879.
Notice of Allowance dated Jul. 28, 2008 for U.S. Appl. No. 11/032,879.
Non-final office action dated Aug. 4, 2010 for U.S. Appl. No. 11/950,214.
Non-final office action dated Nov. 26, 2010 for U.S. Appl. No. 12/122,186.
Non-final office action dated May 14, 2007 for U.S. Appl. No. 11/039,534.
Final office action dated Oct. 26, 2007 for U.S. Appl. No. 11/039,534.
Dated Jun. 20, 2008 for U.S. Appl. No. 11/039,534.
Board Decision dated Sep. 27, 2010 for U.S. Appl. No. 11/039,534.

* cited by examiner

SYSTEMS AND MEDIA FOR UTILIZING ELECTRONIC DOCUMENT USAGE INFORMATION WITH SEARCH ENGINES

CROSS-REFERENCES TO RELATED APPLICATION(S)

Pursuant to 35 USC §120, this continuation application claims priority to and benefit of U.S. patent application Ser. No. 11/032,872, entitled "SYSTEMS, METHODS, AND MEDIA FOR UTILIZING ELECTRONIC DOCUMENT USAGE INFORMATION WITH SEARCH ENGINES", filed on Jan. 11, 2005, the disclosure of which is incorporated herein in its entirety for all purposes.

BACKGROUND OF THE INVENTION

The present invention is in the field of data processing systems and, in particular, to systems, methods and media for utilizing electronic document usage information with search engines.

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. Examples of such personal computer systems are International Business Machine Corp.'s (IBM's) ThinkCentre™, ThinkPad™, Aptiva™, and IntelliStation™ series of personal computers. The use of mobile computing devices, such as notebook PCs, personal digital assistants (PDAs), tablet PCs, sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet. Such connectivity has facilitated unprecedented amounts of collaboration and sharing of information between individuals, both within organizations and outside organizational structures. This collaboration has resulted in individuals having access to and sharing vast amounts of information, often in the form of electronic documents.

Electronic documents are digitized documents that contain text, graphics, photographs, etc., and can be read by various computer systems. Electronic documents may contain text or graphics, and a wide variety of file formats have been used, such as Portable Network Graphics (PNG), Joint Photographic Experts Group (JPEG), Graphics Interchange Format (GIF), Tag Image File Format (TIFF), Microsoft Word (DOC), etc. Other file formats capable of handling text and graphics include Hypertext Markup Language (HTML) and Adobe Systems Inc.'s Portable Document Format (PDF). For many applications, electronic documents, particularly PDF documents, have supplanted printed material for the dissemination of information, as many journals, newsletters, books, articles, etc., and now distributed either exclusively or non-exclusively in electronic form.

The vast amount of content, including electronic documents, available on public networks such as the Internet often makes it difficult for users to find useful and relevant information. Accordingly, many people utilize search engines to assist them in their search. Search engines are programs that search documents on a network for specified keywords and return to the requester a list of documents where the keywords were found. Typically, a search engine works by sending out a "spider" to fetch as many documents as possible, after which an "indexer" reads the documents and creates an index for the words contained in each document. Each search engine then typically creates indices using a proprietary algorithm so that meaningful results are returned for each query. Example publicly-available search engines include those provided by Microsoft Corporation, Google Inc., Yahoo! Inc., etc.

While search engines are quite powerful, they suffer from some flaws. First, search engines do not always identify the most relevant links early in the search results. Search engines also do not always identify the portion of a document most likely to satisfy the customer or requester, as they only identify, at best, the portion of the document in which the search words were found. This problem is exacerbated for larger documents, as a user may not know where to look in a very long document for the most relevant information. Additionally, search engines are often misled by the frequent appearance of keywords, such as when document developers attempt to mislead a search engine into giving a higher priority for a particular site or document by incorporating large numbers of keywords in the document in a process known as "keyword spamming". Keyword spamming often results in erroneous or misleading query results, making the search engine less desirable for the user. Improving the performance of search engines will likely increase the usage of that search engine and thus the revenue generated from it.

There is, therefore, a need for an easy and effective system to improve the functionality of search engines, particularly when search engines are used to find information contained in portions of electronic documents.

BRIEF SUMMARY OF THE INVENTION

The problems identified above are in large part addressed by systems, methods and media for utilizing electronic document usage information with search engines. Embodiments receive a search request from a requesting user and receive document utilization information associated with one or more electronic documents, where the document utilization information provides an indication of the usage of the electronic documents by one or more users. Embodiments may then generate search results based at least partially on the search request and the document utilization information and transmit an indication of the search results to the requesting user. Embodiments may also generate statistical information regarding the search results for electronic documents and transmit the generated statistical information.

Another embodiment provides a machine-accessible medium containing instructions effective, when executing in a data processing system, to cause the system to perform a series of operations for determining electronic document usage. The series of operations receives a search request from a requesting user and receives document utilization information associated with one or more electronic documents, where the document utilization information provides an indication of the usage of the electronic documents by one or more users. The series of operations may also generate search results based at least partially on the search request and the document utilization information and transmit an indication of the search results to the requesting user. Embodiments may also generate statistical information regarding the search results for electronic documents and transmit the generated statistical information.

A further embodiment provides a document usage system. The document usage system may include a user communications module to receive a search request from a user and to transmit search results to the user. Embodiments may also include an aggregator server communications module to receive, from an aggregator server, document utilization information associated with one or more electronic documents. Embodiments may also include a search algorithm module for generating search results based on the search request received from the user and the received document utilization information. Further embodiments may also include a spider module for searching network sites for content and an indexer module for analyzing the content of network sites for keywords.

BRIEF DESCRIPTION OF THE SEVERAL VIEWS OF THE DRAWINGS

Other objects and advantages of the invention will become apparent upon reading the following detailed description and upon reference to the accompanying drawings in which, like references may indicate similar elements.

DETAILED DESCRIPTION OF THE INVENTION

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intent is to cover all modifications, equivalents, and alternatives falling within the spirit and scope of the present invention as defined by the appended claims. The detailed descriptions below are designed to make such embodiments obvious to a person of ordinary skill in the art.

Systems, methods, and media for utilizing electronic document utilization information to respond to user search requests with search engines are disclosed. In the disclosed embodiments, the document usage system receives a search request, such as one requesting a search based on particular keywords, from a requesting user. The document usage system receives document utilization information associated with one or more electronic documents, where the document utilization information provides an indication of the usage of the electronic documents by one or more users. The document usage system may then generate search results in response to the search request based at least partially on the received document utilization information, after which it transmits an indication of the search results to the requesting user. The document utilization information supplements the information otherwise available to generate search results by providing information regarding how documents have actually been used.

The disclosed embodiments improve the quality of search results provided to users by incorporating document utilization information in determining network sites or electronic documents that satisfy a search request (as well as the relative ranking of the search results), resulting in more meaningful and accurate search results. This may result in identification of the particular portion of an electronic document that is likely to be most relevant to the requesting user, further improving the value of the search results. Improved quality of search results may increase the usage and revenue of a search site, as well as increase access to electronic documents for which document utilization information is available. Keyword spamming would often be ineffective when document utilization information is considered, reducing the misleading results created by keyword spamming.

While specific embodiments will be described below with reference to particular configurations of hardware and/or software, those of skill in the art will realize that embodiments of the present invention may advantageously be implemented with other substantially equivalent hardware and/or software systems.

Figure 1:
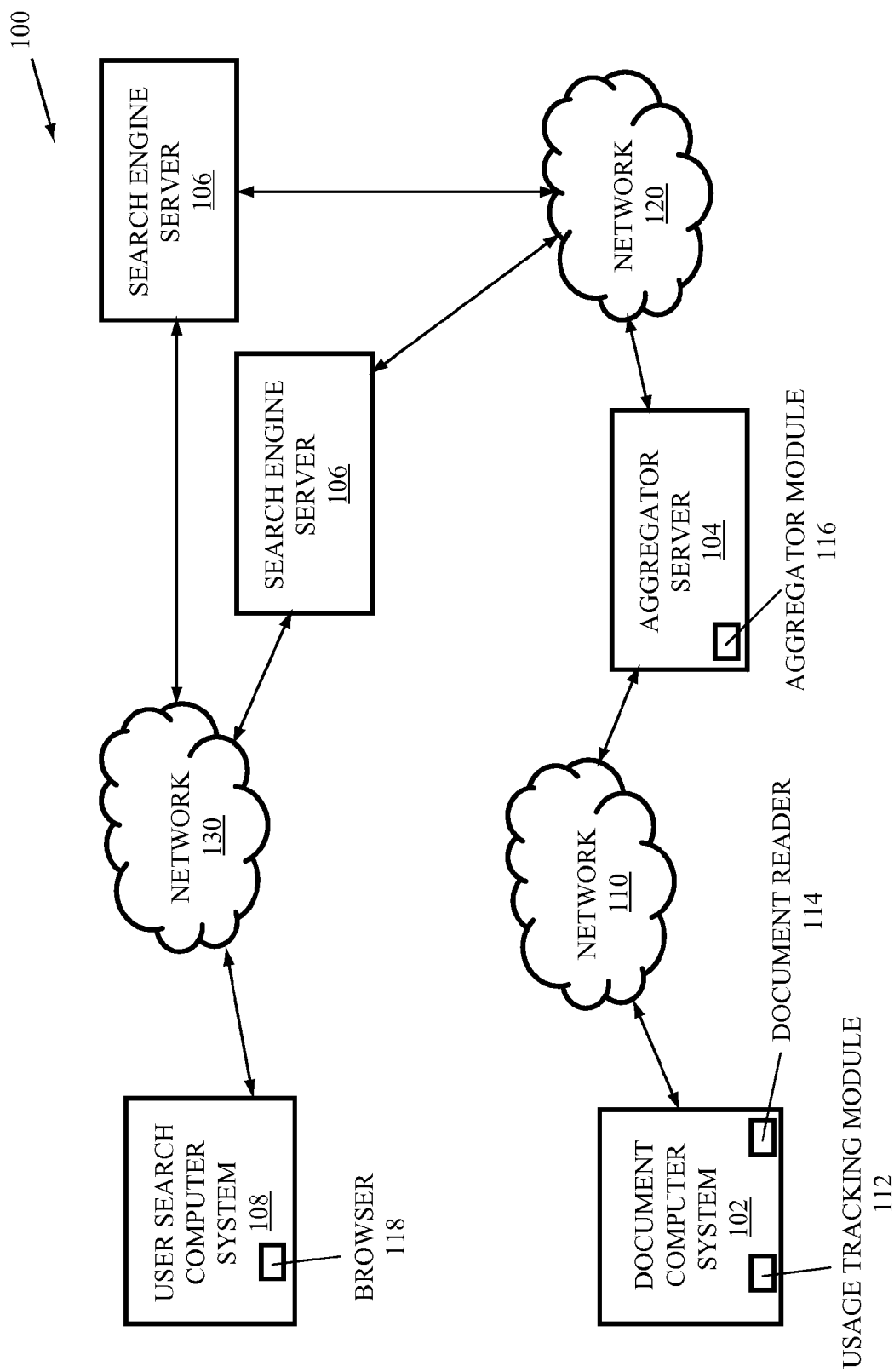
FIG. 1 depicts an environment for a system for utilizing electronic document usage information in a search engine according to one embodiment.

Turning now to the drawings, FIG. 1 depicts an environment for a system for utilizing electronic document usage information in a search engine according to one embodiment. In the depicted embodiment, the document usage system 100 includes one or more document computer systems 102 in communication with a network 110. Each document computer system 102 may contain a usage tracking module 112 and a document reader 114. A user may view electronic documents using the document reader 114 while the usage tracking module 112 tracks information relating to the user's access of particular electronic documents. In the depicted embodiment, the document usage system 100 also includes one or more aggregator servers 104 in communication with the document computer systems 102 via network 110 for aggregating document usage information gathered from document computer systems 102. The one or more aggregator servers 104 may be in communication with one or more search engine servers 106 via network 120, while the one or more search engine servers 106 may be in communication with one or more user search computer systems 102 via network 130. A user on a user search computer system 108 may use a browser 118 or other program to request a search from a search engine server 106. A search engine server 106 may then provide search results to a user on a user search computer system 108 based at least partially on document usage information received from an aggregator server 104.

Electronic documents may be digitized documents that contain text, graphics, photographs, etc. that may be read by various computer systems. Electronic documents may contain text or graphics and may use any type of file format, such as PNG, JPEG, GIF, TIFF, DOC, HTML, PDF, RTF, TXT, MCW, etc. Electronic documents may include any type of document, such as books, eBooks, articles, journals, World Wide Web (Web) pages, etc. Electronic documents may, in one embodiment, include multiple pages and/or other means of organizing the document, such as chapters, sections, volumes, etc.

Networks 110, 120, 130 may be any type of data communications channel, such as the Internet, an intranet, a LAN, a WAN, an Ethernet network, a wireless network, a proprietary network, a broadband cable network, etc. Networks 110, 120, and/or 130 may be the same or different networks. The Internet or other public network may be particularly useful as network 110, 120, and 130 when the search engine server 106 is hosting a publicly-accessible search site. Those skilled in the art will recognize, however, that the invention described herein may be implemented utilizing any type or any combination of data communications channels.

Document computer systems 102 may include personal computers, workstations, servers, mainframe computers, notebook or laptop computers, desktop computers, PDAs, tablet or palm PCs, set-top boxes, mobile phones, wireless devices, or the like. The usage tracking module 112 may track the user's usage of an electronic document being viewed. Usage of an electronic document may include opening or closing the electronic document, creating or deleting bookmarks in the electronic document, time spent with the electronic document open, printing the electronic document, e-mailing or otherwise transmitting the electronic document, etc. In one embodiment, the usage of the electronic document is tracked based on the portion of the electronic document being used, such as a page, chapter, section, etc. of the document. A user may utilize a document computer system 102 to view or read electronic documents using a document reader 114, such as a browser (e.g., Microsoft Corporation's Microsoft Explorer™, etc.), dedicated electronic document reader software (e.g., Adobe Systems Inc.'s Adobe Acrobat® or Reader), or other software. The document reader 114 may be any software module that is used to display an electronic document. Examples of currently existing document readers 114 include Adobe Systems Inc.'s Adobe Acrobat® or Reader, Microsoft Corporation's Word™ or Reader™, Palm Corporation's Reader™, MobiPocket Reader, etc.

Figure 2:
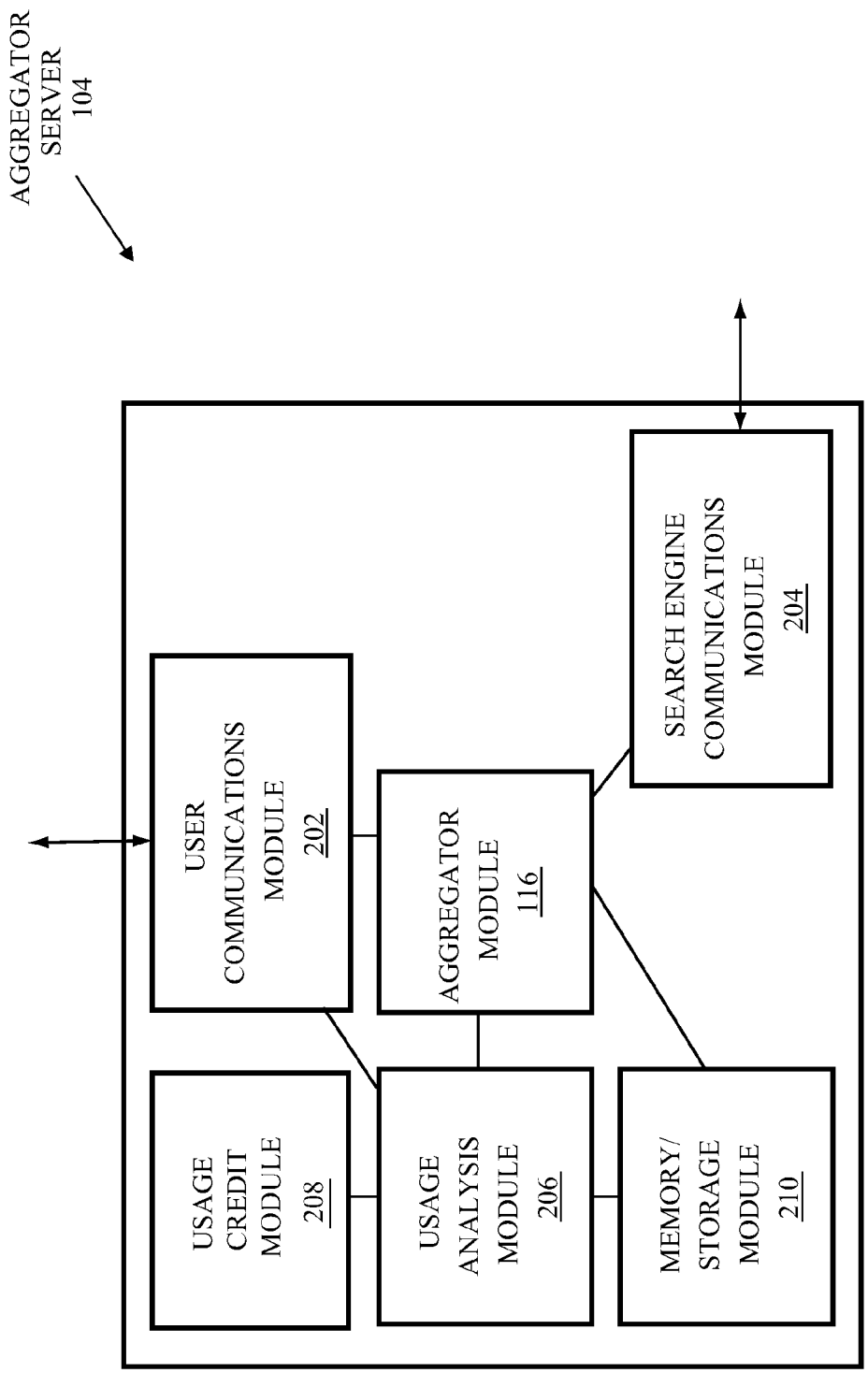
FIG. 2 depicts one embodiment of an aggregator server of the electronic document usage system of FIG. 1.

Aggregator servers 104 may include one or more PCs, workstations, servers, mainframe computers, notebook or laptop computers, desktop computers, or the like, and are described in more detail in relation to FIG. 2. Each aggregator server 104 may include an aggregator module 116 for collecting and aggregating electronic document usage information received from users on a document computer system 102. For example, the aggregator module 116 may aggregate the amount of time that each user spent on a particular page of an electronic document for all users who viewed the document on a document computer system 102. In this embodiment, the aggregator module 116 determines the pages (or other sections or portions) of the electronic document on which users have spent the most time viewing. Time spent viewing a page or other portion of a document may be used as a proxy for the value, utility, or relevance of the information included on that page. The aggregator module 116 may analyze, collect, or aggregate electronic document usage information for electronic documents in any fashion.

In one embodiment, a single aggregator server 104 may be used to determine electronic document usage by receiving indications of electronic document usage from the document computer systems 102 and processing the data. The aggregator server 104 of this embodiment may include local storage, such as a hard drive, or may include other storage, such as a hard drive array, remote storage over a network, a Redundant Array of Independent Disks (RAID) system, etc. In another embodiment, a plurality of aggregator servers 104 may be utilized where one aggregator server 104 is designated as a primary aggregator server 104 so that document computer systems 102 will first attempt to transmit usage information to it. Any of the aggregator servers 104 in this embodiment, however, may receive information from the document computer systems 102. The plurality of aggregator servers 104 may replicate their collected information with each of the other aggregator servers 104 so that if one is temporarily disabled or permanently removed, the usage information will still be available.

One or more search engine servers 106 may be in communication with any aggregator modules 104 (via network 120) and with any user search computer systems 108. The one or more search engine servers 106 may include one or more PCs, workstations, servers, mainframe computers, notebook or laptop computers, desktop computers, or the like. A search engine server 106 may receive a search request from a user on a user search computer system 108, where the search request may include keywords or other parameters that define the scope of the user's desired search. A search engine server 106 may transmit search results to a user on a user search computer system 108 once the search has been completed. A search engine server 106 may receive aggregated document usage information from an aggregator server 104 to be used or supplement search results for the user.

User search computer systems 108 may include personal computers, workstations, servers, mainframe computers, notebook or laptop computers, desktop computers, PDAs, tablet or palm PCs, set-top boxes, mobile phones, wireless devices, or the like. A user search computer system 108 may include a browser 118 for creating and submitting search requests and for viewing search results. Browser 118 may be a graphical browser application that allows a user to view Internet or intranet content such as Microsoft Corporation's Internet Explorer, Netscape Communication Corporation's Navigator, Mozilla, Apple Corporation's Safari, etc. Using a browser 118, a user may connect to a network site associated with a search engine server 106, create and submit a search, and view the search results when the search is completed. Alternatively, a user may use a type of software other than a browser 118 for creating search requests and viewing search results. A single computer system may serve as both document computer system 102 and user search computer system 108.

The document usage system 100 of the disclosed embodiments may advantageously provide improved results from search engines, increasing the value of search results to users and ultimately the number of users using a search engine and the potential revenue from the search engine. The document usage system 100 uses document utilization information created from usage information gathered from a plurality of users to supplement search results provided to users. Document utilization information provides an indication of the valuable or relevant portions of a document based on the amount that a document (or portion of a document) has actually been used or bookmarked. For example, if a document matches the search request and thus appears in the search results, the document usage system 100 may point users to the most heavily used sections (i.e., the most relevant), potentially saving the user's time and improving the results. In another example, documents or sections of documents that have been heavily viewed by users may be moved up in the search result list, possibly improving the quality of search results. Heavily viewed documents often provide more relevant and timely information to users, as users are unlikely to spend large amounts of time with documents that are not useful.

Referring now to FIG. 2, there is shown an aggregator server 104 of the document usage system 100 of FIG. 1 according to one embodiment. In the embodiment of FIG. 2, the aggregator server 104 includes an aggregator module 116, a user communications module 202, a search engine communications module 204, a usage analysis module 206, a usage credit module 208, and a memory module 210. The aggregator module 116 is described in relation to FIG. 1. The user communications module 202 may receive information, such as usage information, from the document computer systems 102 via the network 110. The user communications module 202 may also transmit information, such as aggregated document utilization information, to the document user computer systems 102. Aggregator server 104 may also include a search engine communications module 204. The search engine communications module 204 may transmit document utilization information (aggregated usage information) or other information to a search engine server 106 via network 120. The search engine communications module 204 may also receive search result statistics or other information from the search engine server 106.

The usage analysis module 206 may provide more sophisticated analysis of the usage information collected and aggregated by the aggregator module 116. For example, the usage analysis module 206 may sort and/or analyze the usage information by type of user, class of user, type of usage (e.g., printing, viewing, bookmarking, etc.), different timeframes (e.g., giving more weight to more recent usage), etc. In one embodiment, an administrator or other user may customize the type of analysis that is performed by the usage analysis module 206.

The usage credit module 208 may award credits, called usage credits herein, to users who are using electronic documents and providing usage information as a reward to those users. A user may use usage credits to receive discounted or free usage of electronic documents, exchange usage credits for cash or other items, or any other use. A user may also use usage credits to receive benefits from the search engine server 106, such as premium searches (e.g., more accurate, quicker, etc.), quicker searches, searches with less or no advertisements, etc. The usage credit module 208 may also manage awarded usage credits, facilitate users using their usage credits, etc. By providing usage credits to users who are using electronic documents and providing usage information to an aggregator server 104, the document usage system 100 will encourage users to agree to provide usage information. For many users, the incentive of getting usage credits will likely outweigh their reluctance to provide information about their particular usage.

Memory module 210 may store any type of information, such as user preferences, electronic documents, document usage information, document utilization information, etc. Any type of memory may be used, including fixed or removable media, permanent or temporary storage, volatile or non-volatile memory, hard drives, CD-ROMs, etc. In one embodiment, memory module 210 may store document identification information, such as document name or identifier, creation or modification date, edition, publisher, document type (e.g., DOC, PDF, etc.), etc. Memory module 210 may maintain usage information in, for example, a table in the memory module 210 organized by document identification. In one embodiment, when no user has provided data for a particular electronic document, memory module 210 may stored an indication that no data exists.

Figure 3:
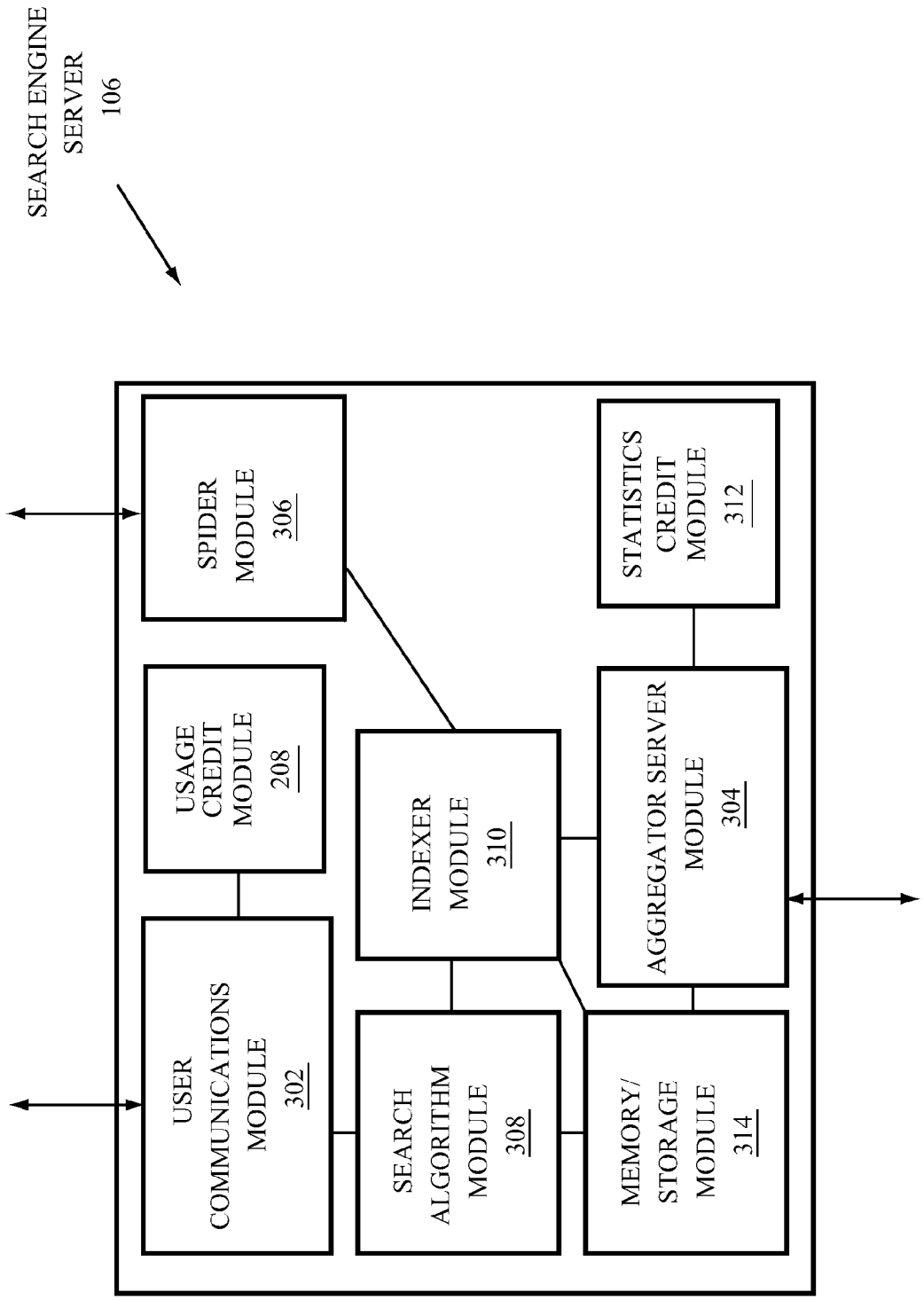
FIG. 3 depicts one embodiment of a search engine server of the electronic document usage system of FIG. 1.

Referring now to FIG. 3, there is shown a search engine server 106 of the document usage system 100 of FIG. 1 according to one embodiment. In the embodiment of FIG. 3, the search engine server 106 includes a user communications module 302, an aggregator server module 304, a spider module 306, a search algorithm module 308, an indexer module 310, a usage credit module 208, a statistics credit module 312, and a memory module 314. The user communications module 302 may receive an indication of a search request or other information from a user search computer systems 108 via the network 130. The user communications module 302 may also transmit an indication of search results or other information to a user search computer system 108. The aggregator server module 304 may receive document utilization information from the aggregator server 104 and may also transmit search result statistics to the aggregator server 104.

The spider module 306 may search the content of sites and/or documents on a network (e.g., the Internet), after which the indexer module 310 may analyze the content of the sites and/or documents to create an index for the words contained in each. The index may be stored in the memory module 314. Memory module 314 may store any type of information, such as generated indexes, document usage information, search results, etc., and memory module 312 may utilize any type of memory, including fixed or removable media, permanent or temporary storage, volatile or non-volatile memory, hard drives, CD-ROMs, etc. In response to receiving a search request from a user, the search algorithm module 308 may search the index created by the indexer module 310 to determine the items (and the ranking of items) in the search result. The search result may include a list of documents (and associated network addresses) where the keywords in the search request were found. The search result may include a ranking of 'hits', or sites and documents satisfying the search, based on their likely interest to the requesting user. The search results may also include a selection of the content in the document containing the keywords.

In one embodiment, the indexer module 310 and/or search algorithm module 308 may utilize information received by the aggregator server module 304 in addition to the index of keywords. For example, if the number of users or the time spent by users for a plurality of electronic documents is known, the search algorithm module 308 and/or indexer module 310 may rank those electronic documents in any search requests for which they satisfy the keyword search in descending order of usage. An electronic document that has been read more often, in other words, might be ranked higher than an electronic document that has been read less frequently. In another example, the search result may reference the portion of an electronic document that is most utilized (as identified by the aggregator module 104), either by link or the content itself, in the search results generated by the search algorithm module 308. This allows a user viewing the search results to see the content most likely to meet their needs.

Each search engine server 106 may also include a usage credit module 208 and a statistics credit module 312. The usage credit module 208 of the search engine server 106 may be similar to the usage credit module 208 of the aggregator server 104, and either or both may grant and manage usage credits. Statistics credit module 312 may grant statistics credit to document providers in exchange for aggregated document utilization information. A document provider (e.g., aggregator server 104 owner, document author, document copyright owner, etc.) may exchange statistics credits for improved services from a search engine provider, such as higher visibility in search results, document utilization information related to other documents, free or discounted advertisements, cash or other items, etc. By providing statistics credits to document providers in exchange for document utilization information, search engine providers are able to encourage document providers to supply document utilization information to improve the quality and content of their searches. Document providers, on the other hand, may receive significant benefits in exchange for information that they are already gathering.

The functions of the various modules of FIGS. 2 and 3 may be combined or distributed in any fashion between the aggregator server 104 and search engine server 106. For example, the functions of the aggregator module 302 and the usage analysis module 304 of the aggregator server 104 may be combined into one module. In another example, all of the functions of the components of the aggregator server 104 may be performed by modules of the search engine server 106 instead, eliminating the need for the aggregator server 104 and network 110 as the search engine server 106 would then communicate directly with any document computer systems 102. Other modifications and combinations are possible.

Figure 4:
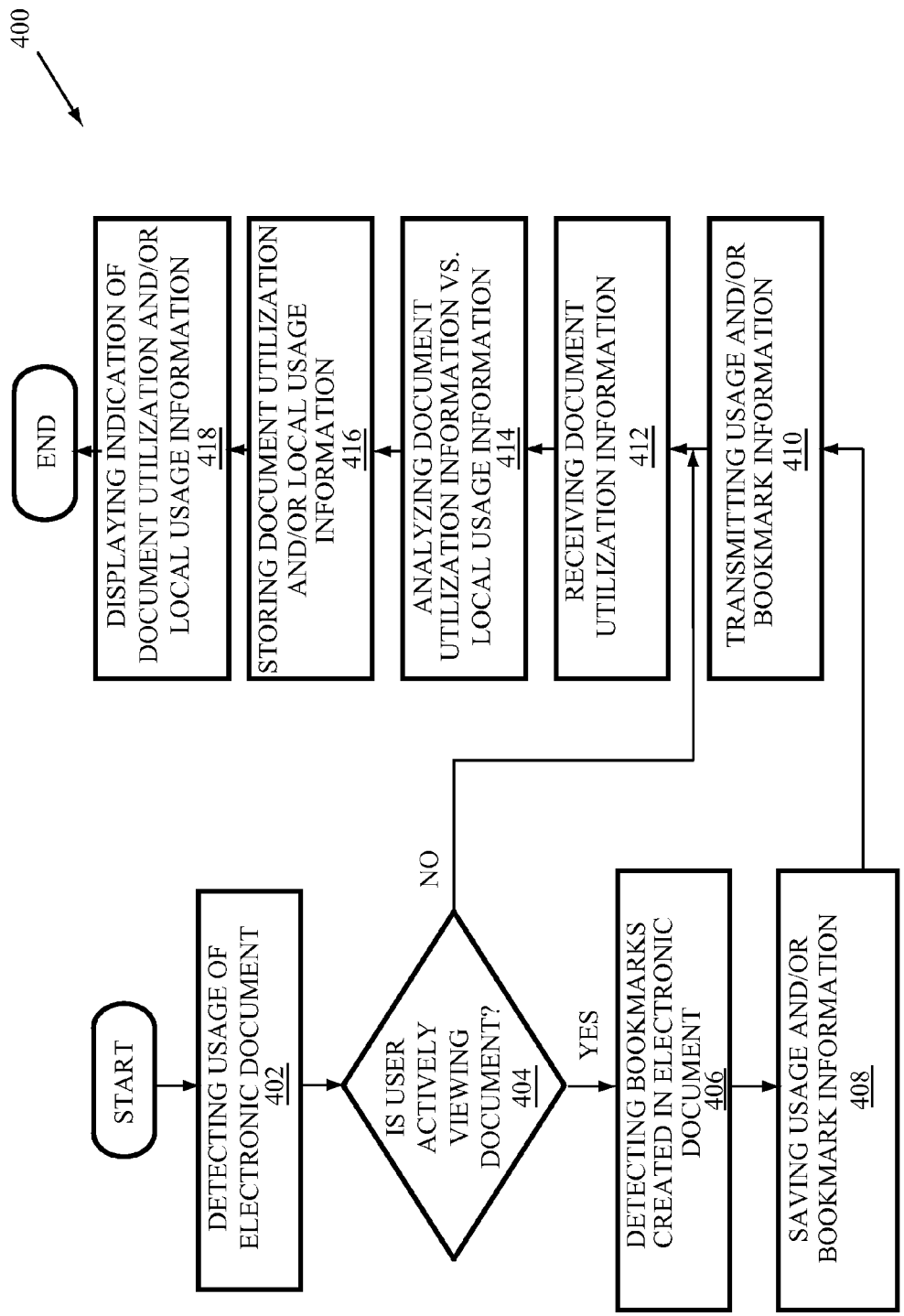
FIG. 4 depicts an example of a flow chart for determining electronic document usage information according to one embodiment.

FIG. 4 depicts an example of a flow chart 400 for determining electronic document usage information according to one embodiment. The method of flow chart 400 may be performed, in one embodiment, by a usage tracking module 112 of a document computer system 102. Flow chart 400 begins with element 402, detecting usage of an electronic document, such as usage by a user using a document reader 114 on a document computer system 102 to view an electronic document. In one embodiment, an indication of the usage of the electronic document is the time a user spends viewing a particular page. For example, the usage of an electronic document may be the time a user spends viewing a PDF document in a document reader 114. If a user spends a relatively long period of time viewing a particular page, it is evidence that the user finds value in the information contained on that page. Similarly, if the user quickly moves past a page, it may reflect less value to the content on that page. Quickly skipping over a page may reflect a lower value than never seeing a page at all, as an unseen page may have more potential to have value than one that is quickly reviewed and moved past. In another example, the usage of an electronic document may include printing of a page of a document, as printing a page provides another indication that the user finds that page valuable. Element 402 may include detection of any type of usage, including both active and passive uses.

Flow chart 400 continues to decision block 404, where it is determined whether the user is actively viewing the electronic document. Optional decision block 404 may provide more accurate usage information as it excludes misleading information, such as when a user leaves a document open for a period of time without actively viewing the document. If it is determined in decision block 404 that the user is not actively viewing the document, the function continues to element 412 and usage information is not transmitted, as there is no valid usage of the electronic document by the user. If the user is actively viewing the electronic document (or if decision block 404 is not used), the function continues to element 406. Any methodology may be used to determine if a user is actively viewing an electronic document. In one embodiment, the expiration of a set time interval without any activity of a user (e.g., user input, etc.) may indicate that the user is no longer actively viewing the document. For example, if no user input is received for ten minutes, the function may determine that the user is no longer active and accordingly will discount any time after the last user input (or expiration of the interval). In another embodiment, use of another function of the computer system provides an indication that the user is not actively viewing an electronic document. For example, if a user is actively utilizing a spreadsheet program, decision block 404 may determine that the user is not actively viewing an electronic document in a document reader 114. In yet another example, a user is not considered to be actively viewing an electronic document if a screensaver activates on the display of a document computer system 102.

In addition to detection of usage, flow chart 400 also optionally detects bookmarks created in the electronic document in element 406. Creation or deletion of bookmarks at a particular location in an electronic document is a type of usage of an electronic document that may provide an even more direct relation to the value a user places on the information at that location. Locations may include a page, section, chapter, paragraph, sentence, word, graph, or any other location or object. A user typically creates a bookmark at a location in an electronic document when they desire to be able to quickly get back to that location. Accordingly, a bookmark is good evidence that the user finds the information at that location of value. Similarly, if a user deletes a bookmark, it is good evidence that the user no longer finds the information at that location of value.

After detecting usage information and/or bookmark information, element 408 saves usage and/or bookmark information to any type of storage. Flow chart 400 transmits any usage and/or bookmark information to an aggregator server 104 via network 110 in element 410. Flow chart 400 may also transmit information about the user and/or document computer system 102 along with the usage information. After document utilization information is created or aggregated by an aggregator server, the method of flow chart 400 continues to element 412, receiving document utilization information, which may be received from, in one example, an aggregator server 104 via network 110.

After receiving aggregated document information, the method of flow chart 400 continues to optional element 414, analyzing document utilization information and any local document usage information. In this element, flow chart 400 compares the document utilization information, which contains aggregate usage information from a plurality of users, to local usage information, such as from the user using the document computer system 102. In this embodiment, a user might find value in seeing how their usage compares to others. The method of flow chart 400 may perform any type of analysis, such as finding similarities or differences in usage, finding the most used pages, finding the common bookmarks, determining recommended additional sections to read for the user, etc. In element 416, the document utilization information and/or any local usage information, or the results of analysis of the two, may be stored locally or remotely, such as on a local hard drive. For example, element 416 stores document utilization information in a file located in the same directory with the electronic document. In another embodiment, element 416 stores document utilization information in the same file as the electronic document, such as by utilizing empty fields, appending the document utilization information at the end of a file, etc. The method of flow chart 400 continues to element 418, displaying an indication of the document utilization information and/or the local usage information to the user. Flow chart 400 may display the information with a document reader 114 or other program and the information may be displayed in any form, such as visual display, auditory display, etc. After element 418, the method terminates.

Figure 5:
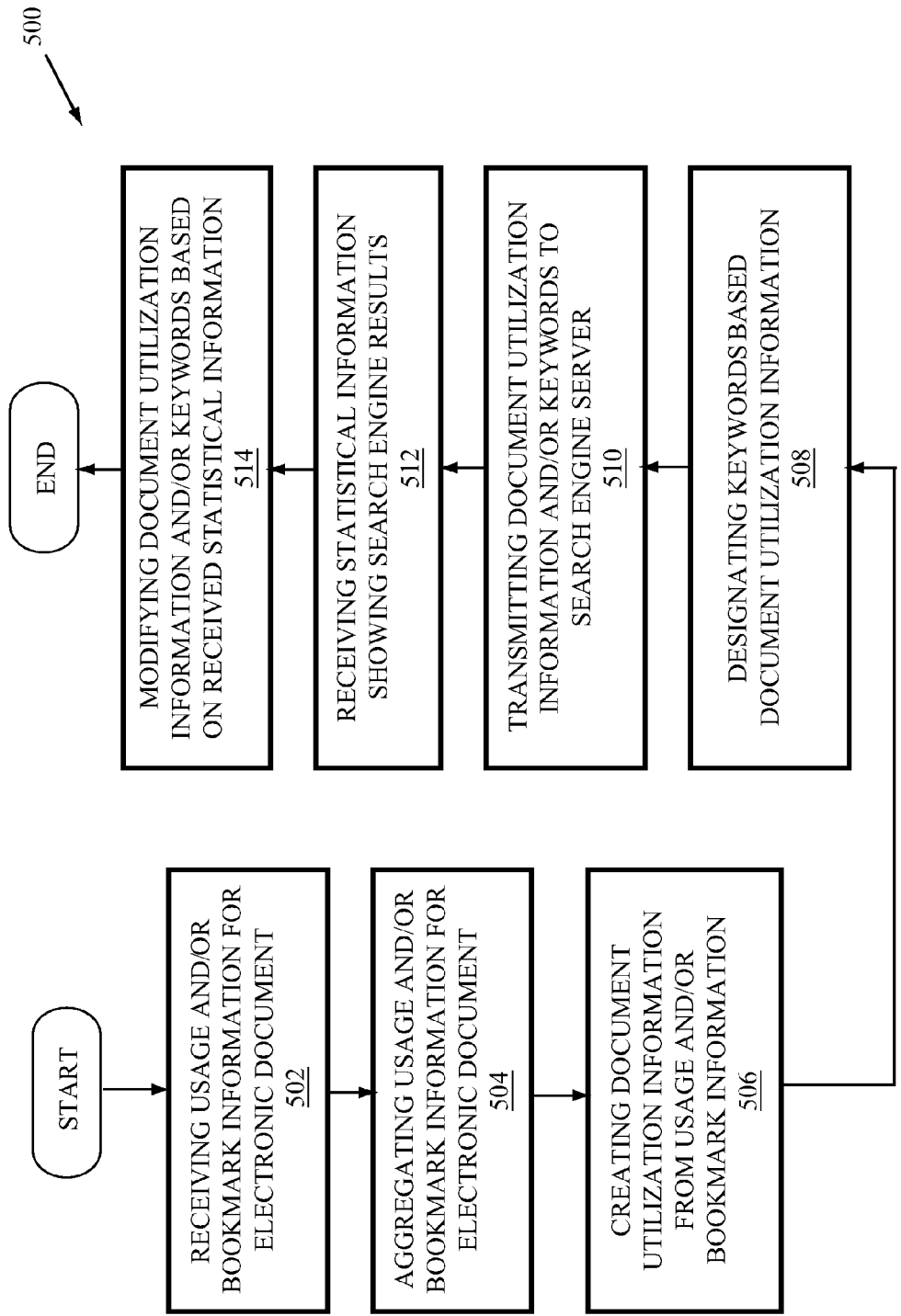
FIG. 5 depicts an example of a flow chart for aggregating electronic document usage information according to one embodiment.

FIG. 5 depicts an example of a flow chart 500 for aggregating electronic document usage information according to one embodiment. The method of flow chart 500 may be performed, in one embodiment, by an aggregator server 104.

Flow chart 500 begins with element 502, receiving usage and/or bookmark information, such as from a plurality of users on document computer systems 102. Flow chart 500 may also receive information about the user and/or computer system that transmitted the information along with the document usage information. After receiving usage and/or bookmark information, the method of flow chart 500 then continues to element 504, aggregating usage and/or bookmark information from multiple users and/or document computer systems 102 for a particular electronic document. Aggregation may occur at the page level (collecting usage of that pages among multiple users), or it may occur at different levels of fidelity, such as higher levels (e.g., chapters, sections, articles, etc.) or lower levels (e.g., paragraphs, sentences, etc.). In one embodiment, flow chart 500 determines the amount of time users cumulatively spent on each page of a particular electronic document in element 504. In another embodiment, flow chart 500 determines the percentage of users who bookmarked each page of an electronic document in element 504.

Flow chart 500 continues to element 506, creating document utilization information from the aggregated usage and/or bookmark information for a particular document. In one example, document utilization information for a particular electronic document includes the relative amounts of time spent on each page of an electronic document by aggregated users. For example, the document utilization information could indicate that users spent an average of 30 seconds on page 1, two minutes on page 2, and 13 seconds on page three, and so on. A bar chart or histogram-like display could be created illustrating the time spent on each page. Using this visual representation, a user could see that page 2, in this example, is probably the most valuable of the electronic document pages. In other embodiments, flow chart 500 may use more sophisticated processing. In another example, usage information may be determined based on a class of users. For example, users can be divided based on some sort of classification (e.g., experts, physicists, programmers, Ph.D. candidates, etc.) and document utilization information may be created specifically based on that classification. In another embodiment, flow chart 500 may combine different types of usage and/or bookmark information into document utilization information. In this embodiment, flow chart 500 may contain bookmark information, time spent on a page, which pages were printed out, etc., to provide an indication of the value of a particular page or section. Any type of processing is possible, and particular types of processing might be requested by users or administrators, set up as defaults, may be used in response to particular types of data, etc.

After creating document utilization information, flow chart 500 designates keywords based on document utilization information in optional element 508. Traditional algorithms choose keywords based primarily on the frequency of appearance of that keyword in a document. In element 508, flow chart 500 may designate keywords based on other factors, such as the frequency of appearance of the keyword weighted by the utilization of the section containing the keyword, bookmarks of pages or sections containing the keyword, etc. A word appearing five times on the most heavily viewed page of a document, for example, may be more relevant to users (and thus more appropriate for a keyword) than a word appearing ten times throughout the entire document. Flow chart 500 may use any type of algorithm or methodology, and any combination of factors, to designate keywords for an electronic document.

Flow chart 500 continues to element 510, transmitting document utilization information and/or keywords, such as to a search engine server 106 via network 120 for use in responding to user search requests. Flow chart 500 may also transmit document utilization information directly to users on document computer systems 102 via network 110 so that the document readers 114 may utilize the information. In optional element 512, the method of flow chart 500 receives statistical information showing search engine results. Flow chart 500 may use the received statistical information in element 514 to modify the document utilization information and/or keywords. For example, flow chart 500 may use the received statistical information to provide additional information in the document utilization information, modify keywords based on search result statistical information, etc. If, in one example, a particular portion of a document often satisfied user search criteria, flow chart 500 could use such information to increase the weight given to that portion of the document when creating document utilization information. After element 514, flow chart 500 terminates.

Figure 6:
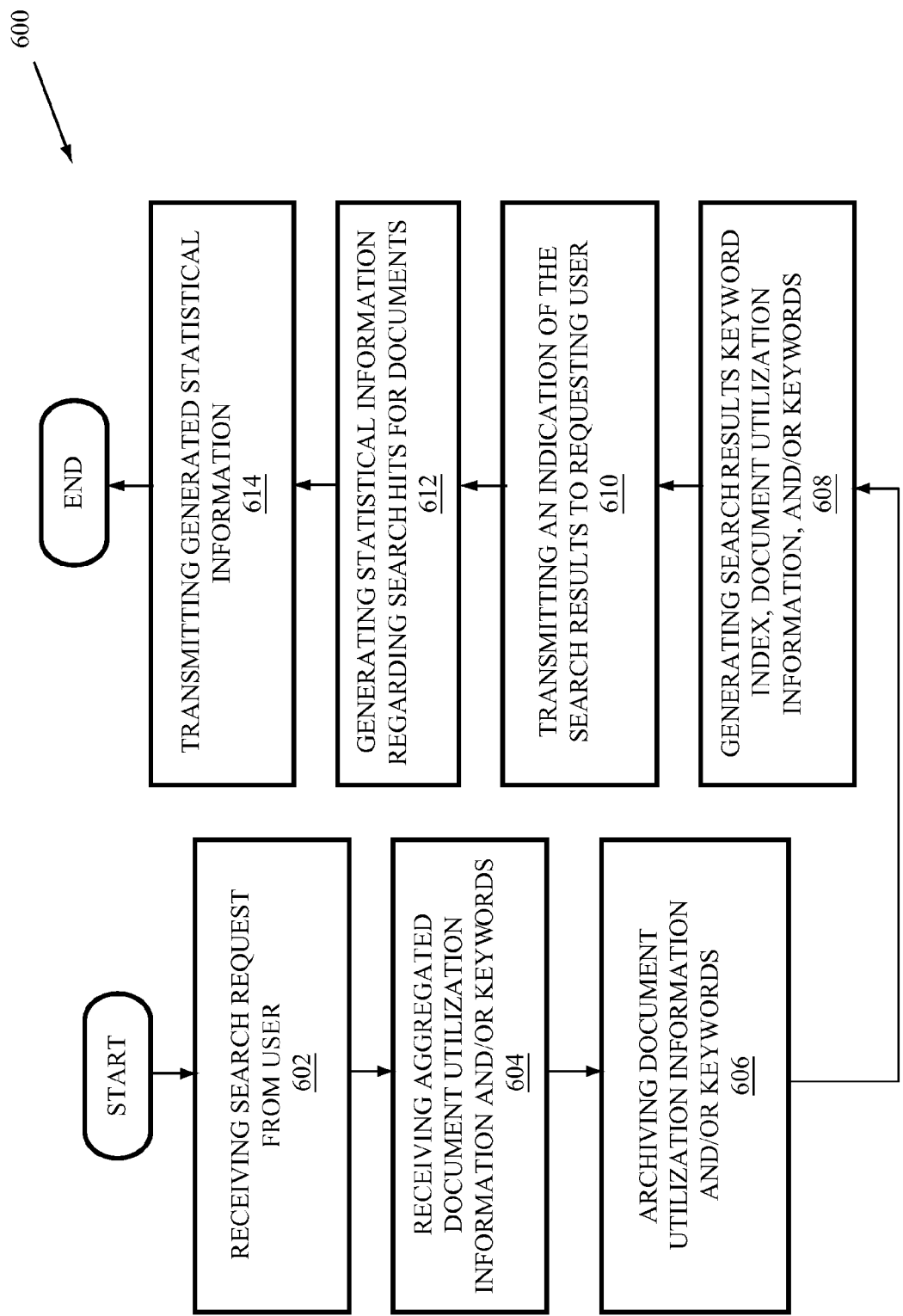
FIG. 6 depicts an example of a flow chart for receiving and utilizing electronic document usage information in a search engine according to one embodiment.

FIG. 6 depicts an example of a flow chart 600 for receiving and utilizing electronic document usage information in a search engine according to one embodiment. The method of flow chart 600 may be performed, in one embodiment, by a search engine server 106. Flow chart 600 begins with element 602, receiving a search request from a user. The received search request may be generated by a user inputting keywords (such as on a network site associated with the search engine) using a browser 118 on a user search computer system 108 and then transmitting the request to the search engine server 106. The method of flow chart 600 then continues to element 604, receiving aggregated document utilization information and/or keywords such as from, for example, an aggregator server 104. The method of flow chart 600 then continues to optional element 606, archiving the received document utilization information and/or keywords.

The method of flow chart 600 continues to element 608, where the search engine server 106 may generate search results in response to the user's search request, where the search results are based on the keyword index, document utilization information and/or keywords. Flow chart 600 may used the received information in any fashion, such as by giving the information a particular weight versus the search index, using the document utilization information to identify a particular relevant portion of a document, using the document utilization information as factors in determining the search results, etc. By using document utilization information and/or keywords provided by the aggregator server 104, the quality and usefulness of the search results may be improved. Knowledge of which portions of a document are more used than others allows a search engine algorithm to consider the value of a portion of a document when generating search results. Accordingly, flow chart 600 may move documents in which keywords appear in heavily used portions of a document to a higher priority in the search results. In another example, flow chart 600 may identify the content of the most useful portion of a document (as identified by a higher usage) in the search results.

After generating search results, the method of flow chart 600 continues to element 610, transmitting an indication of the search results to the requesting user on a user search computer system 108, such as via network 130. The user may then view an indication of the search results on browser 118. In optional element 612 flow chart 600 may generate statistical information regarding search results for particular documents. Statistical information regarding search results may include the number of times a particular document was included in search results, the document's position in search results, the number of times a user followed the link to the document, etc. After element 612, the method of flow chart 600 continues to optional element 614, transmitting the generated statistical information, after which the method terminates. The search engine server 106 may generate and transmit the statistical information to the aggregator server 104 or users on user search computer systems 108 or document computer systems 102 for eventual display.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for utilizing electronic document usage information in search engines. It is understood that the form of the invention shown and described in the detailed description and the drawings are to be taken merely as examples. It is intended that the following claims be interpreted broadly to embrace all the variations of the example embodiments disclosed.

What is claimed is:

1. A machine-accessible medium of a document usage system which includes one or more document computer systems in communication with a network, containing instructions effective, when executing in a data processing system, to cause said data processing system to perform operations comprising:
   receiving a search request from a requesting user on a user computer system, wherein the search request comprises one or more keywords;
   receiving document utilization information associated with one or more electronic documents to be searched in response to the received search request, the document utilization information providing an indication of the usage of electronic documents by one or more users, the document utilization information comprising an amount of time that users have accessed particular sections of one or more electronic documents;
   generating search results from a plurality of electronic documents based on both the search request and the received document utilization information, by changing a position of a particular electronic document in the search results based on usage of that particular electronic document relative to other of the plurality of electronic documents, wherein changing the position of the particular electronic document in the search results comprises improving the position of the particular electronic document in the search results in response to determining that a keyword from the search request is included in a section of the particular electronic document that has been accessed by users a longer period of time than other sections of the particular electronic document have been accessed; and
   transmitting the search results to the requesting user via a network for accessing by the user.

2. The machine-accessible medium of claim 1, further comprising archiving the received document utilization information.

3. The machine-accessible medium of claim 1, further comprising:
   generating statistical information regarding search results for electronic documents; and
   transmitting the generated statistical information.

4. The machine-accessible medium of claim 1, further comprising:
   receiving keywords associated with one or more electronic documents; and
   wherein generating search results from the plurality of electronic documents based on both the search request and the received document utilization information comprises generating search results based on the search request, the received document utilization information, and the received keywords.

5. A search engine server of a document usage system which includes one or more document computer systems in communication with a network and having a machine-accessible medium storing a plurality of program modules, the system comprising:
   a user communications module stored on the machine-accessible medium for receiving a search request from a user on a user computer system and for transmitting search results to the user via a network for accessing by the user, the search request comprising one or more keywords;
   an aggregator server communications module stored on the machine-accessible medium for receiving, from an aggregator server, document utilization information associated with one or more electronic documents to be searched in response to a received search request, the document utilization information providing an indication of the usage of electronic documents by one or more users and comprising an amount of time that users have accessed particular sections of one or more electronic documents; and
   a search algorithm module stored on the machine-accessible medium to generate search results from a plurality of electronic documents based on both the search request received from the user and the received document utilization information by changing a position of a particular electronic document in the search results based on usage of that particular electronic document relative to other of the plurality of electronic documents, wherein changing the position of the particular electronic document in the search results comprises improving the position of the particular electronic document in the search results in response to determining that a keyword from the search request is included in a section of the particular electronic document that has been accessed by users a longer period of time than other sections of the particular electronic document have been accessed.

6. The system of claim 5, further comprising a spider module stored on the machine-accessible medium to search network sites for content.

7. The system of claim 5, further comprising an indexer module stored on the machine-accessible medium to analyze content of network sites for keywords.

8. The system of claim 5, further comprising a memory module stored on the machine-accessible medium to store document utilization information associated with one or more electronic documents.

* * * * *

UNITED STATES PATENT AND TRADEMARK OFFICE
CERTIFICATE OF CORRECTION

PATENT NO. : 8,005,811 B2
APPLICATION NO. : 12/166082
DATED : August 23, 2011
INVENTOR(S) : Viktors Berstis Page 1 of 1

It is certified that error appears in the above-identified patent and that said Letters Patent is hereby corrected as shown below:

On the Title Page, Col. 2 (Other Publications), lines 2-3, delete "http://silas psfc.mit.edu" and insert -- http://silas.psfc.mit.edu --, therefor.

Signed and Sealed this
Twenty-ninth Day of November, 2011

David J. Kappos
*Director of the United States Patent and Trademark Office*